United States Patent [19]
Engel et al.

[11] Patent Number: 4,953,421
[45] Date of Patent: Sep. 4, 1990

[54] POWER-TRANSMISSION JOINT

[75] Inventors: Michael Engel, Neuendorf; Karl-Heinz Pepping, Schleiden; Gunther Gebhardt, Stadtkyll, all of Fed. Rep. of Germany

[73] Assignee: Diehl GmbH & Co., Nuremberg, Fed. Rep. of Germany

[21] Appl. No.: 305,387

[22] Filed: Jan. 30, 1989

[30] Foreign Application Priority Data

Mar. 1, 1988 [DE] Fed. Rep. of Germany ....... 3806522

[51] Int. Cl.$^5$ .............................................. G05G 1/04
[52] U.S. Cl. .................... 74/523; 74/471 R; 74/473 R; 464/102
[58] Field of Search .................. 464/89, 185, 101, 102, 464/112; 74/471 R, 471 XY, 473 R, 473 P, 473 SW, 527

[56] References Cited

U.S. PATENT DOCUMENTS

| | | |
|---|---|---|
| 1,128,432 | 2/1915 | Fetzer . |
| 1,948,708 | 2/1934 | Grundy ................. 464/102 |
| 2,131,414 | 9/1938 | Westburgh .................. 464/102 |
| 3,750,424 | 8/1973 | Nettleton ................. 464/102 |
| 4,193,748 | 3/1980 | Swain ................. 464/112 |
| 4,286,442 | 9/1981 | Peterson ................. 464/102 X |
| 4,385,898 | 5/1983 | Jordan ................. 464/101 |
| 4,583,754 | 4/1986 | Seeliger ................. 74/471 R |
| 4,762,015 | 8/1988 | Katayama ................. 74/473 SW |
| 4,779,477 | 10/1988 | Horton ................. 74/473 R |

FOREIGN PATENT DOCUMENTS

| | | |
|---|---|---|
| 1675809 | 10/1969 | Fed. Rep. of Germany . |
| 2640344 | 3/1977 | Fed. Rep. of Germany . |
| 7734203 | 4/1978 | Fed. Rep. of Germany . |

Primary Examiner—Vinh T. Luong
Attorney, Agent, or Firm—Scully, Scott, Murphy & Presser

[57] ABSTRACT

A power-transmission joint for manual transmissions in motor vehicles for insertion intermediate a drive shaft and a shift rod of said transmission, having a box-like cage forming a frame with a sliding block fixedly arranged in the cage. The sliding block has a central bore therethrough for receipt of a steering journal, and is held in a retaining member which engages the cage in a resilient manner to allow for longitudinal displacement and a predefined rotational movement of the sliding block.

5 Claims, 2 Drawing Sheets

POWER-TRANSMISSION JOINT

BACKGROUND OF THE INVENTION

1. Field of the Invention

The present invention relates to a power-transmission joint or coupling for manual transmission for insertion intermediate a drive shaft and a shift rod, which is constituted from a cage for a universal joint, a sliding block fixedly arranged in the cage for the receipt of a steering journal, and elastic elements.

2. Discussion of the Prior Art

From the disclosure of German Published Patent Appln. 26 40 344 there has become known the employment of an elastic power-transmission joint for the steering column of a motor vehicle. In the case of an accident, axial impacts or shock loads are absorbed by the power-transmission joint for the protection of the driver of the vehicle. Provided for this purpose are bearing sleeves with elastic blocks for a steering journal. The bearing sleeves are configured in a manner so as to facilitate a certain displacement of the steering journal during the deformation of the elastic blocks. However, during normal operation no appreciable amount of play is present along the direction of the drive shaft and the power output or take-off shaft. As a consequence thereof, this power-transmission joint is not adapted for utilization in the shifting linkage of a transmission for a motor vehicle transmission. The reason for the foregoing is that during the shifting of a transmission for a motor vehicle, power peaks can be readily felt at the shift lever, which render the shifting uncomfortable inasmuch as power impulses will be transmitted almost undampened from the transmission to the shift lever.

SUMMARY OF THE INVENTION

Accordingly, it is an object of the present invention to be able to uncouple the so-called external and internal shifting system from each other in a manner such that no jerky or recoil-like power peaks will be noticeable at the shift lever during the shifting sequence.

The present invention achieves this object through the particular feature in that the cage for the universal joint possesses a rectangular cutout, the sliding block being configured square-shaped in conformance with the shape of the cutout, and being retained by a retaining element along its circumference or sides without any play in only a plane of pivoting about a predetermined axis, whereas in the longitudinal direction or in the direction of displacement for the sliding block there are provided unobstructed paths for a defined floating motion and rubber-elastic shock absorbers.

BRIEF DESCRIPTION OF THE DRAWINGS

Reference may now be had to the following detailed description of an exemplary embodiment of the invention, taken in conjunction with the accompanying drawings; in which.

DETAILED DESCRIPTION OF THE PREFERRED EMBODIMENTS

Figure 1:
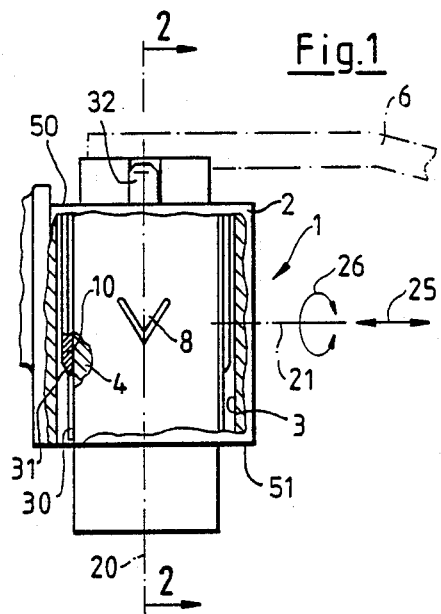
FIG. 1 illustrates a side elevational view of the inventive power transmission joint.
Figure 2:
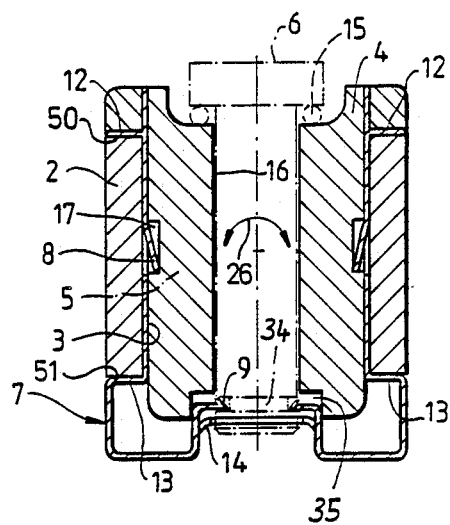
FIG. 2 illustrates a side cross sectional view of the power-transmission joint of FIG. 1 along lines 2—2.
Figure 3:
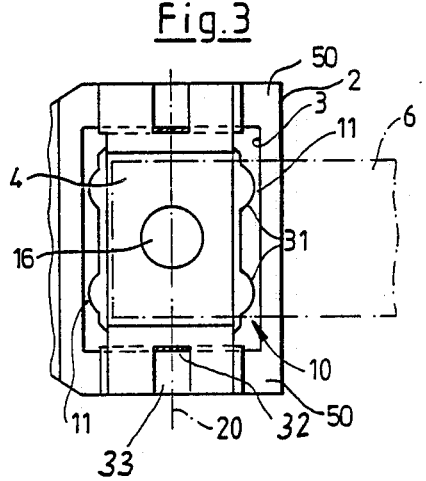
FIG. 3 illustrates a top plan view of the power-transmission joint of FIG. 1.

The power-transmission joint or coupling 1 is constituted of a cage 2 for a universal joint which possesses a rectangular cutout 3, a sliding block 4, with a journal 5 and shift rod 6 represented by the dash-dot lines, a spring steel plate 7 having latching tongues 8 and 9, and a rubber-elastic shock-absorber means 10.

The sliding block 4 is supported within the cage 2 for the universal joint 1 generally as follows:

The sliding block 4 is supported by the spring steel plate 7 so as to be pivotable almost without any play about the axis 21 in the pivot plane 20. In the directions of displacement along the axis 21 pursuant to arrow 25, it is also supported by the steel spring plate 7; however, with unhindered paths of movement 11 relative to the cutout 3.

The spring steel plate 7 is connected in a close fit through angle pieces 12 and 13 with the cage 2 for the universal joint, by means of the latching tongues 8 and the cutout 17, as well as through angled connector webs 14 in the complementary cut-out depression 35 and with the tongues 32 in the grooves 33, connected in a close fit with the sliding block 4. Angle pieces 12 and 13 contact guide surfaces 50 and 51, respectively, which facilitate movement in the direction of arrow 26. The journal 5 is fixed in the bore 16 provided in the cage 2 for the universal joint by the latching tongues 9 engaging into the groove 34. A sealing ring 15 is arranged on the journal 5.

The shock absorber means 10 are connected at both sides with the sliding block 4 through the intermediary of vulcanizing. They are each constituted of a base plate 30 possessing, respectively, two hemispherically profiled ribs 31.

Figure 4:
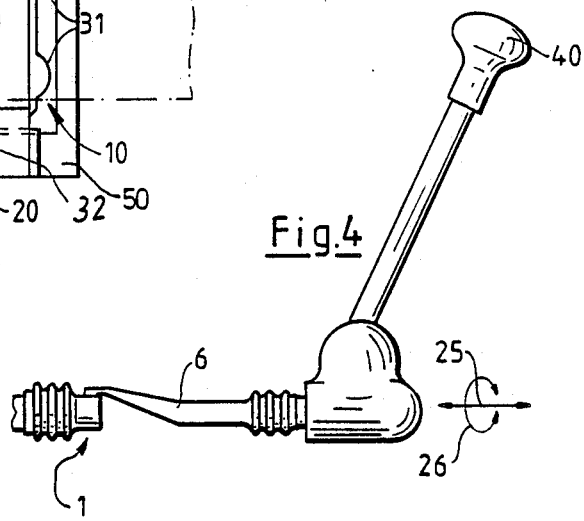
FIG. 4 illustrates the shifting linkage of as motor vehicle transmission having the power-transmission joint of FIG.1.
Figure 5:
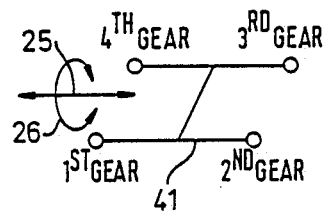
FIG. 5 illustrates a shifting scamatic of a motor vehicle transmission.
Figure 6:
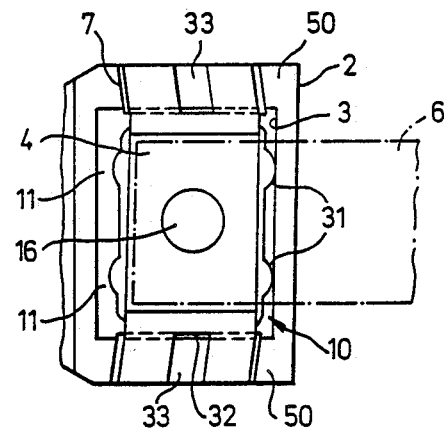
FIG. 6 illustrates a top plan view of the power-transmission joint of FIG. 3 after movement.

The function of the inventive power-transmission joint or coupling is as follows:

Pursuant to FIGS. 4 and 5, a shift lever 40 is actuated in conformance with a shifting schematic 41.

The power-transmission joint 1 possesses the shock absorbers 10 which act progressively in the shifting direction 25, and which attenuate the shifting peaks with respect to pull and pressure imparted from a transmission (not shown). In addition thereto, the joint possesses a definite floating movement in accordance with the unhindered paths 11. Thereby, any jerky engagement of the transmission elements is weakened to such an extent, that these effects will not be noticeable at the shift lever 40.

In the shift selecting direction, having reference to arrow 26, there are not built in any spring elements or elastic shock absorbers, so as to impart a precise shift selecting feel to the driver.

What is claimed is:

1. A power-transmission joint for a manual transmission for insertion intermediate a drive shaft of said transmission of a shift rod forming a universal joint, comprising a cage; a sliding block fixed in said cage for the receipt of a steering journal, said cage forming a frame having a rectangular cut-out portion, said sliding block having a box-like shape with a central bore therethrough in conformanace with said cut-out portions; retaining means for retaining said sliding block along the perimetrical sides thereof for pivoting without play within a pivoting plane about a predetermined axis and including unhindered paths in the direction of displacement for said sliding block for a defined floating movement thereof and a rubber-elastic shock absorber means positioned between said cage and said sliding block.

2. A power-transmission joint as claimed in claim 1, wherein said retainer means comprises a spring steel plate; angle members supporting said retainer means in the pivoting plane in a close fit on said cage for the universal joint and in the direction of displacement facilitates a sliding movement between said spring steel plate and said cage for the universal joint.

3. A power-transmission joint as claimed in claim 2, wherein said spring steel plate includes resilient latching tongues engaging in complementary cut-outs for a close-fitted engagement with said sliding block; and angled connector webs being retained in close fit in complementary cut-out depressions for the additional positioning of said sliding block.

4. A power-transmission joint as claimed in claim 1, wherein said shock absorber means comprises a base plate with rims, and said shock absorber means is fixedly connected with said sliding block.

5. A power-transmission joint as claimed in claim 4, wherein the ribs project from the base plate and possess a substantially hemispherical profile.

* * * * *